US011762848B2

(12) United States Patent
Sharifi et al.

(10) Patent No.: US 11,762,848 B2
(45) Date of Patent: Sep. 19, 2023

(54) COMBINING PARAMETERS OF MULTIPLE SEARCH QUERIES THAT SHARE A LINE OF INQUIRY

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/903,449

(22) Filed: Sep. 6, 2022

(65) Prior Publication Data

US 2022/0414093 A1    Dec. 29, 2022

Related U.S. Application Data

(63) Continuation of application No. 16/912,298, filed on Jun. 25, 2020, now Pat. No. 11,468,052.

(51) Int. Cl.
| | |
|---|---|
| *G06F 17/00* | (2019.01) |
| *G06F 16/242* | (2019.01) |
| *G06F 16/2457* | (2019.01) |
| *G06F 16/248* | (2019.01) |
| *G06F 16/23* | (2019.01) |
| *G06F 18/22* | (2023.01) |
| *G06F 18/214* | (2023.01) |

(52) U.S. Cl.
CPC ......... *G06F 16/2428* (2019.01); *G06F 16/23* (2019.01); *G06F 16/248* (2019.01); *G06F 16/24575* (2019.01); *G06F 18/214* (2023.01); *G06F 18/22* (2023.01)

(58) Field of Classification Search
CPC ............... G06F 16/2428; G06F 16/23; G06F 16/24575; G06F 16/248; G06F 16/3328; G06F 16/3329; G06F 16/3343; G06F 16/3344; G06F 18/214; G06F 18/22
See application file for complete search history.

(56) References Cited

U.S. PATENT DOCUMENTS 8,725,756 B1    5/2014  Garg et al.
9,858,358 B1 *  1/2018  Garg ................... G06F 16/9574
(Continued)

OTHER PUBLICATIONS

Benetka, J R et al.; Anticipating Information Needs Based on Check-in Proceedings of the Tenth ACM International Conference on Web Search and Data Mining (WSDM '17); Association for Computing Machinery, New York, NY, USA; pp. 41-50; dated Feb. 2017.

*Primary Examiner* — Greta L Robinson
(74) *Attorney, Agent, or Firm* — Gray Ice Higdon

(57) ABSTRACT

Methods, systems, and computer readable media related to generating a combined search query based on search parameters of a current search query of a user and search parameters of one or more previously submitted search quer(ies) of the user that are determined to be of the same line of inquiry as the current search query. Two or more search queries may be determined to share a line of inquiry when it is determined that they are within a threshold level of semantic similarity to one another. Once a shared line of inquiry has been identified and a combined search query generated, users may interact with the search parameters and/or the search results to update the search parameters of the combined search query.

18 Claims, 6 Drawing Sheets

(56) References Cited

U.S. PATENT DOCUMENTS

| | | |
|---|---|---|
| 10,275,485 B2 | 4/2019 | Joshi |
| 2010/0138293 A1* | 6/2010 | Ramer ............... G06Q 30/0275 |
| | | 705/14.46 |
| 2015/0235643 A1 | 8/2015 | Kim |
| 2015/0269176 A1 | 9/2015 | Marantz et al. |
| 2015/0356136 A1* | 12/2015 | Joshi ....................... G06F 16/29 |
| | | 707/769 |
| 2016/0321266 A1 | 11/2016 | Philippov et al. |
| 2016/0364460 A1 | 12/2016 | Shuster et al. |
| 2021/0026906 A1 | 1/2021 | Reznik |
| 2021/0182283 A1 | 6/2021 | Carney et al. |
| 2021/0406260 A1 | 12/2021 | Sharifi et al. |

\* cited by examiner

COMBINING PARAMETERS OF MULTIPLE SEARCH QUERIES THAT SHARE A LINE OF INQUIRY

BACKGROUND

Individuals (also referred to herein as "users") often perform online research by submitting a plurality of search queries that progressively narrow down responsive search results to a manageable or desired level. However, these searches are typically "stateless" in that for a given query, the user will typically be provided with the same results each time. Some search interfaces provide interactive elements that allow the user to add filters and other search parameters, and these parameters may be maintained across submission of multiple search queries. However, the user must manually engage with these interactive elements, which may be cumbersome or even impossible if the user is conducting his or her research using a speech interface.

SUMMARY

Implementations are described herein for determining that multiple search queries are part of a shared line of inquiry, and for formulating and submitting a combined search query that includes parameters from the multiple search queries. As a result, a user is able to submit multiple search queries in a way that maintains at least some state that ties the multiple queries together. This can, for instance, reduce the likelihood that the user is presented with identical results during different turns of the user's research. It also relieves the user of having to manually formulate their own ever-growing search query that captures all the search parameters the user has input during different turns of their line of inquiry.

In some implementations, two search queries may be compared to determine whether they are part of a shared line of inquiry, e.g., by virtue of their being semantically related. For example, both queries may be embedded in latent space, and a distance between the embeddings may be determined as a proxy for semantic similarity. If the queries are semantically related/similar, then parameters from both queries may be used to add a "state" to the user's line of inquiry, e.g., by formulating a combined query that includes parameters from both queries. Thus, the user's latest search query is effectively augmented with parameters from previous quer(ies), in some cases without the user being explicitly informed as such.

Additionally or alternatively, in some implementations, heuristics and/or "linking" grammars may be used to determine whether two or more search queries are part of a shared line of inquiry. Suppose a user starts by searching for "Bluetooth earbuds." The user may be presented with responsive results, including a list of Bluetooth earbuds. However, the user may then say something like, "Actually, I need true wireless." In some implementations, a linking grammar may be provided to detect what will be referred to herein as a "link back phrase," "Actually, I need . . . ". Detection of this link back phrase may be used as a signal that the remainder of the user's utterance ("true wireless earbuds") should be used to augment the previous search query. Thus, a combined search query may be formulated to include the parameters "Bluetooth" (which is "remembered" from the previous search), "true wireless," and "earbuds" (also "remembered" from the previous search). The ensuing search results may include true wireless Bluetooth earbuds, which are ear buds without any wired connection between them.

In some implementations, the user may be prompted for approval to enter a "stateful" research mode, e.g., in response to a determination that the user has entered two or more search queries that appear to be part of a shared line of inquiry. If the user consents, then one or more of the user's previous search queries, such as their most recent search query, and/or subsequent search queries that appear to be part of the same line of inquiry (e.g., semantically similar, linked via a linking grammar or heuristics, etc.) may be used to formulate one or more combined search queries that each include search parameters from multiple past search queries. In some implementations, the user may be kept apprised of their combined search query, e.g., with a selectable list of currently-applicable search parameters. In some implementations, a user may be able to add additional parameters by interacting with elements of search results. For example, a user could strikethrough a word or phrase of a search result to cause a filter to be applied that excludes other results matching the struckthrough word or phrase.

This specification is directed to methods, systems, and computer readable media (transitory and non-transitory) related to comparing a current search query to a previous search query, determining that the current search query and the previous search query relate to a shared line of inquiry based on the comparing, formulating a combined search query to include at least one search parameter from each of the current search query and the previous search query based on the determining, and submitting the combined search query to cause one or more databases to be searched based on the combined search query.

In some implementations, comparing the search queries includes determining a measure of semantic similarity between the current search query and the previous search query. In some implementations, comparing the search queries includes determining a distance in latent space between a first embedding generated from the current search query and a second embedding generated from the previous search query. In some implementations, comparing the search queries includes applying one or more grammars to the current search query to identify one or more relate-back terms in the current search query.

In some implementations, in response to determining that the current search query and the previous search query share a line of inquiry, a prompt is provided to the user that solicits the user to enter a state-maintaining search mode. In such implementations, formulating the combined query may be performed based on receiving user input in response to the prompt.

In some implementations, the search parameters may be provided to the user as part of a graphical user interface ("GUI") presented in the form of a list of active search parameters, including the at least one search parameter from each of the current search query and the previous search query. In some implementations, the GUI may be interactive and provide one or more interactive tokens of a search result that is responsive to the combined search query and an updated combined search query may be formulated based on the one or more tokens. In some of these implementations, the user may interact with the interactive GUI by providing a striking through of one or more of the tokens. In these implementations, the updated combined search query may be formulated to exclude search results matching the one or more tokens. In some implementations, a similarity function used to determine whether queries are part of the same line of inquiry may be trained based on the detected user interaction with one or more of the tokens.

In some implementations, the current search query and the previous search query may be input to one or more computing devices of a coordinated ecosystem of computing devices. In some implementations, the current search query and the previous search query may be input by the same user. In some implementations, the current search query and the previous search query may be input by multiple users in association with a shared research session identifier. In some implementations, the method may further include searching a database for one or more historical search queries that are semantically related to the current search query, wherein the previous search query is selected from the one or more historical search queries.

DETAILED DESCRIPTION

Figure 1A:
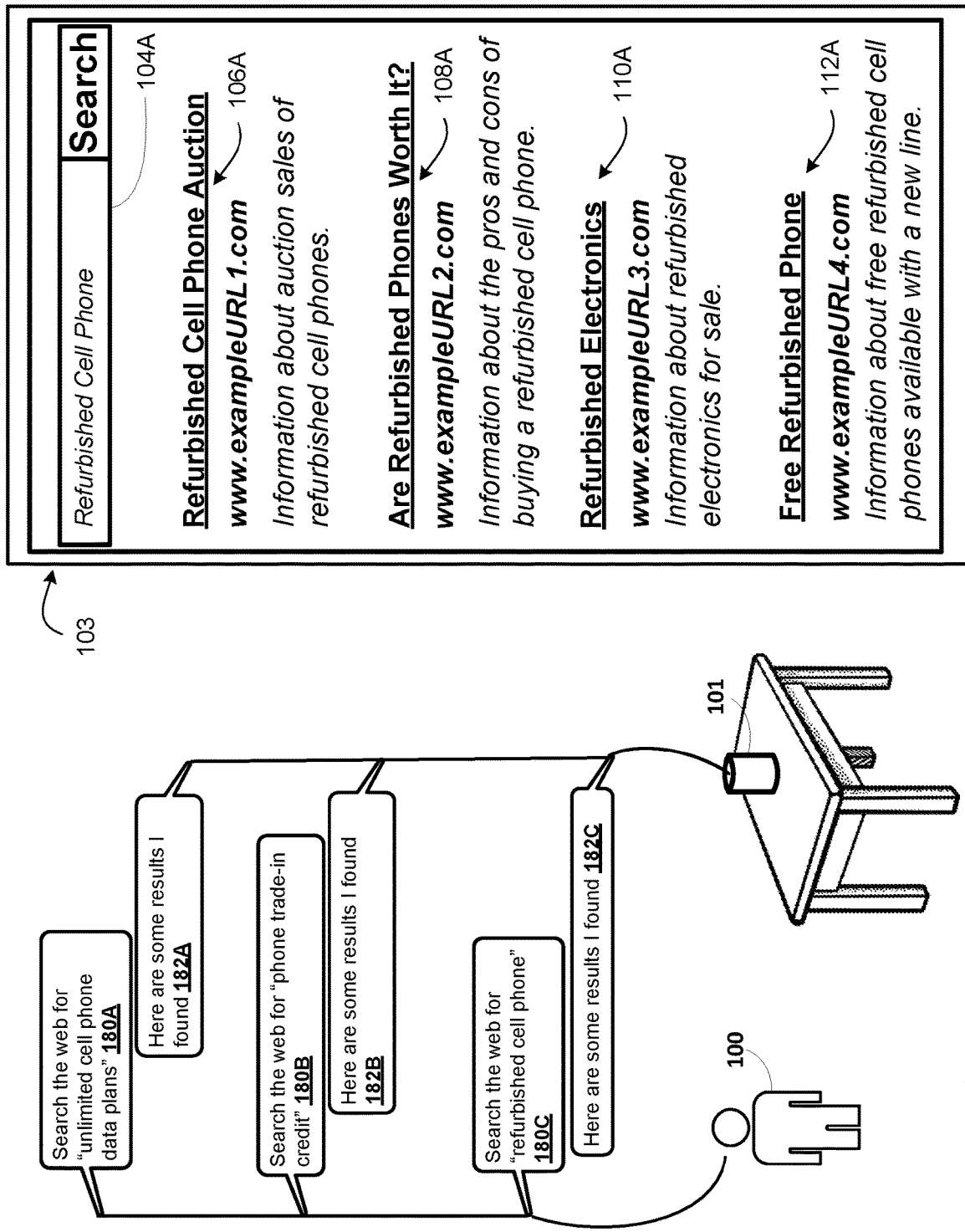
FIG. 1A and FIG. 1B illustrate an example ecosystem of communicatively coupled computing devices enabling interaction between a user and a virtual assistant implemented via at least the ecosystem of communicatively coupled devices according to implementations described herein.

As noted previously, implementations are described herein for determining that multiple search queries are part of a shared line of inquiry, and for formulating and submitting a combined search query that includes parameters from the multiple search queries. In some (but not all) implementations, humans may perform this "stateful" searching as described herein by engaging in human-to-computer dialogs with interactive software applications referred to herein as "virtual assistants" (also referred to as "automated assistants," "chatbots," "interactive personal assistants," "intelligent personal assistants," "assistant applications," "conversational agents," etc.). For example, humans (when they interact with virtual assistants may be referred to as "users") may provide commands and/or requests to a virtual assistant using spoken free-form natural language input (i.e. utterances), which may in some cases be converted into text using speech recognition processing and then processed, and/or by providing textual (e.g., typed) free-form natural language input. A virtual assistant responds to a request by providing responsive user interface output, which can include audible and/or visual user interface output. As used herein, free-form natural language input is input that is formulated by a user and that is not constrained to a group of options presented for selection by the user.

In some cases, a virtual assistant may analyze the user's free-form natural language input using various types of processing, such speech recognition processing (if the input was spoken), natural language processing (e.g., coreference resolution, entity tagging, parts-of-speech annotation, etc.), syntactic processing, and/or semantic processing. As a result of these various types of processing, in some cases the virtual assistant may identify a user's intent (e.g., "perform search," "request weather," "retrieve information," "operate appliance," "order food," etc.) and any user-provided parameters that are to be used to resolve the user's intent. As one example, an utterance such as "turn the front porch light green" may generate an intent of "modify light output" with parameters of "front porch" and "green." Once the virtual assistant determines the intent and parameter(s) (where applicable), the virtual assistant can resolve that intent by performing various responsive actions, such as causing the light designated as the "front porch" light to emit green light.

The virtual assistant may perform various forms of semantic processing to achieve various goals, such as allowing a user to perform "stateful" searching as described herein. For example, the virtual assistant may perform semantic processing on a user's free-form natural language input to identify keywords to be used in generating a query based on an input of a user. In some implementations, the semantic processing may be used to identify when two or more search queries issued comprise a shared line of inquiry by monitoring queries submitted by a user over time for a threshold level of semantic similarity. When the virtual assistant generates search queries and performs searches, the virtual assistant may provide, as audio and/or visual output at the client computing device and/or one or more additional computing device(s), information that is responsive to the search queries.

The virtual assistant may be configured to access or retrieve one or more previously submitted search queries that were most recently submitted by a user each time it receives a current search query from the user via user interface input, in order to perform a semantic similarity analysis between the previous search queries and the current search query. When the virtual assistant recognizes a current search query and a given previously submitted search query share a threshold level of semantic similarity, then the virtual assistant may be configured to determine that the two search queries share a single line of inquiry. In some implementations, the virtual assistant may be configured to compare the most recent previously submitted search query to the current search query first. If the most recent previously submitted search query is determined to share a line of inquiry with the current search query, the virtual assistant may compare the current search query to the next most recently submitted previous search query. This process may repeat until the virtual assistant determines that a next most recent previously submitted search query does not share a line of inquiry with the current search query, or until a particular number of the most recent previously submitted search queries are all determined to share a line of inquiry with the current search query.

Other variations are contemplated. For example, queries that are not received sequentially (e.g., there are intervening queries between them) may nonetheless be determined to be part of the same line of inquiry if they are sufficiently semantically related. In some implementations, the fact that two queries were received in a row and/or within a particular time interval of each other (e.g., during the same dialog session) may be used as another signal that dictates whether those queries are part of the same shared line of inquiry or not. For example, two queries that otherwise have a modest measure of semantic similarity to each other may nonetheless be considered part of the same line of inquiry because they were received in a row, or at least within a time interval of each other. In other words, the fact that the queries were received in a row may be used as a signal to boost the likelihood that they are deemed part of the same line of inquiry. Had those two queries been received at different times, and/or with some number of intervening queries in between, on the other hand, that modest measure of semantic similarity may not be sufficient alone to classify the queries as part of the same line of inquiry. In some implementations, the number of intervening queries (or dialog turns with the virtual assistant) between two queries may be inversely related to a likelihood that those two queries may be deemed part of the same line of inquiry.

The virtual assistant may further be configured to perform selected aspects of the present disclosure to generate a combined search query comprising at least one search parameter from the current search query and at least one search parameter from each of the most recent previously submitted queries determined to share a line of inquiry with the current search query.

"Search parameter" as used herein refers to one or more terms and/or any relevant modifiers of the terms in a given query. For example, if a user previously submitted a search query of "Female presidential candidates NOT Elizabeth Warren", then the terms "Elizabeth Warren" may be determined to be modified by "NOT". Thus, a search parameter derived from the previously submitted search query of "Female presidential candidates NOT Elizabeth Warren" and thereafter used to form a combined search query, along with one or more search parameters of the current search query, may be "NOT Elizabeth Warren". The resulting combined search query may then be used to identify one or more resources that include the terms "NOT Elizabeth Warren", exclude the terms "Elizabeth Warren" if they were otherwise present, or only include or reference the terms "Elizabeth Warren" in certain contexts (e.g., contexts in which it can be inferred that the exclusion of "Elizabeth Warren" from some group is being discussed).

Additionally, in some implementations, the search parameters may be as mandatory, optional, weighted, or unweighted and may also be used to rank the search results after obtaining the resources responsive to the combined query. The mandatory/optional and weighted/unweighted designations may be determined by the virtual assistant based on a variety of factors, such as the semantic similarity of the query terms that correspond to the search parameters, the semantic similarity of the queries from which the search parameters were derived, the frequency of multiple users submitting the search parameters to the virtual assistant or a search system associated with the virtual assistant, and/or one or more relationships indicated by a knowledge graph containing entities referenced in one or more of the queries used in generating the combined search query. Thereafter, search results including the terms "Elizabeth Warren" may be demoted in the search results presentation page or may be excluded entirely, search results including the terms "not Elizabeth Warren" may be promoted in the search results presentation page, or search results referencing "Elizabeth Warren" may be included, excluded, promoted, or demoted based on the inferred context surrounding the inclusion of the terms "Elizabeth Warren" in the search result.

Figure 1B:
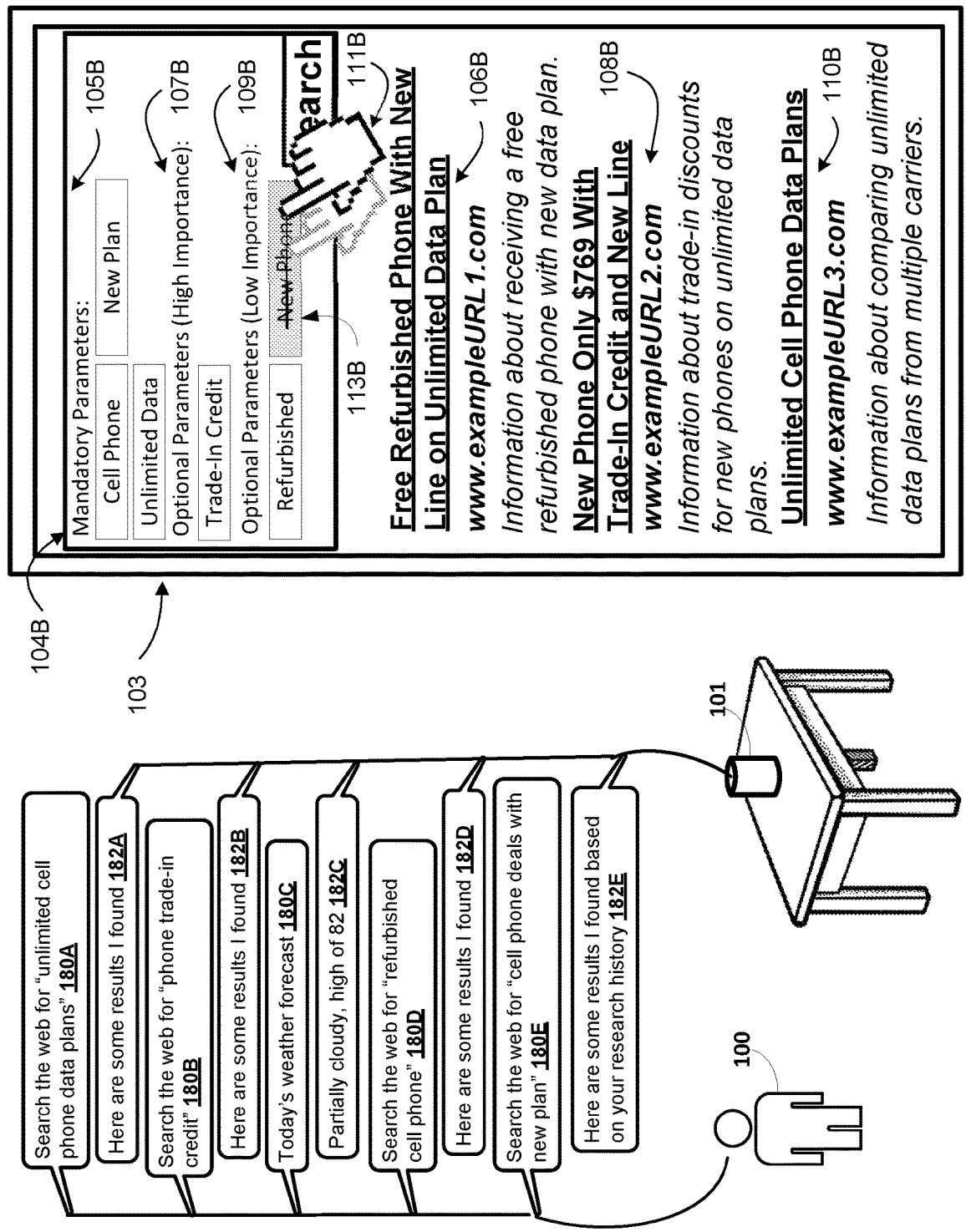

FIGS. 1A-1B illustrate an example ecosystem of communicatively coupled computing devices 101, 103 enabling interaction between a user 100 and a virtual assistant implemented via at least the ecosystem of communicatively coupled devices 101, 103 according to implementations described herein. The ecosystem of communicatively coupled computing devices 101, 103 includes at least one computing device 101 comprising one or more microphones and one or more speakers and at least one computing device 103 comprising a display. The display screen of example computing device 103 is displaying an example of a search query 104A determined from a user utterance 180C and search results 106A, 108A, 110A, and 112A determined to be responsive to that search query 104A. One or more aspects of the virtual assistant may be implemented on the computing devices 101, 103 and/or on one or more computing devices that are in network communication with the computing devices 101, 103.

The examples of FIG. 1A illustrate a sequence of searches performed by the virtual assistant before the virtual assistant determines that a shared line of inquiry exists. In FIG. 1A, the user 100 has previously submitted the search queries of "unlimited cell phone data plans", "phone trade-in credit", and "refurbished cell phone" at 180A, 180B, and 180C. In response to receiving each user interface input 180A, 180B, and 180C, the virtual assistant has obtained resources that are responsive to the search query and provided them as search results at 182A, 182B, and 182C. In some implementations, the virtual assistant may read all or a portion of the search results aloud. In the implementation shown in FIGS. 1A and 1B, the virtual assistant provides an audible confirmation that the search has been performed at 182A, 182B, and 182C, but the search results are provided to the user via a communicatively coupled computing device 103. Example search results 106A, 108A, 110A, and 112A rendered by computing device 103 are illustrated in FIG. 1A for the example query of "refurbished cell phone" 104A, which may also be provided with the output by the virtual assistant for presentation to the user 100 along with the search results 106A, 108A, 110A, and 112A.

Turning now to FIG. 1B, the dialog turns are similar to those in FIG. 1A except that in the user interface input at 180C, user 100 now asks a question that is obviously unrelated semantically to the current line of inquiry: "Today's weather forecast." The virtual assistant responds, "Partially cloudy, high of 82." Because this question and the response thereto are semantically dissimilar from the previous searches, an embedding generated from the question/response would likely be distant from embeddings generated from the previous search queries in latent space. Accordingly, the question/response would not likely be considered part of the same line of inquiry.

Next, at 180D, user 100 asks the same question that was asked at 180C of FIG. 1A: "Search the web for 'refurbished cell phone'". The virtual assistant may determine that the user interface input at 180D is a current search query with at least a threshold level of semantic similarity to the previously submitted search queries determined from user interface inputs 180A and 180B, but not 180C. At 180E, the user provides voice input of "Search the web for 'cell phone deals with new plan'" at one or more of the microphones of example computing device 101. The virtual assistant may process the voice input and determine that the intent of user 100 is to perform a search with the search string, "cell phone deals with new plan".

The virtual assistant may then compare the current search query to the most recent previously submitted search query of "refurbished cell phone" and determine that they are sufficiently semantically similar to be identified as sharing a line of inquiry. The virtual assistant may additionally or alternatively compare the current search query to one or more previously-submitted search queries and determine whether they too share the line of inquiry with the current search query. This may continue until, for example, the virtual assistant has determined that all of the search queries generated by the virtual assistant based on the user voice inputs received at 180A, 180B, and 180D share a line of inquiry with the current search query (180E).

After the virtual assistant had identified all or a maximum number of the most recent previously submitted search queries and that share a line of inquiry with the current search query, the virtual assistant may generate a combined search query 104B based on determining search parameters 105B, 107B, and 109B of the combined query from each of the current search query and the most recent previously submitted queries that share the line of inquiry. For example, in FIG. 1B, the virtual assistant has generated the "Mandatory [Search] Parameters" 105B as "cell phone", "unlimited data", and "new plan", the "Optional [Search] Parameters [with] High Importance" 107B as "trade-in credit", and the "Optional [Search] Parameters [with] Low Importance" 109B as "refurbished" and "new phone". In other implementations, parameters may not be categorized as depicted in FIG. 1B. For example, the user may simply see a combined or "running" search query string (or list of search parameters): <"cell phone", "new plan", "unlimited data", "trade-in credit", "refurbished", and "New Phone">

Subsequent to generating the combined search query 104B, the virtual assistant searches one or more search databases based on the combined search query 104B, identifies resources that are responsive to the combined search query 104B, ranks them, and provides them to the user 100 as search results 106B, 108B, and 110B via the display of example computing device 103. As discussed above, the search results 106B, 108B, and 110B may additionally or alternatively be provided completely or partially in audio form via one or more of the speakers in example computing device 101.

The virtual assistant may provide a visual 104B and/or audio 182D representation to the user that the search was performed based on the combined search query 104B rather than based on the current search query, which was "cell phone deals with new plan". The virtual assistant may additionally provide visual 104B or audio representations of the search parameters 105B, 107B, and 109B via the display of example computing device 103 or one or more of the speakers of example computing device 101.

In some examples, the search parameters 105B, 107B, and 109B may be provided in the form of interactive "tokens" with which users may interact via user input, such as voice input received by example device 101 and/or touch input received by a touch screen display of example computing device 103.

For example, in FIG. 1B the user 100 may be seen providing a "touch-swipe" action 111B corresponding to a "strikethrough" motion on a selectable graphical "token" corresponding to the search parameter "new phone" 113B. Such "strikethrough" action may serve to remove the search parameter "new phone" 113B from the combined search query completely. Alternatively, such an action may serve to change the search parameter "new phone" 113B to a search parameter modified by the Boolean operator "NOT" such that "NOT new phone" would be the modified search parameter. User 100 may additionally drag the search parameters 105B, 107B, and 109B into various mandatory/optional designation categories or provide a "right-click", "long-touch", "double-click", or similar touch input to open up editing menus for the search parameters.

In some implementations, the user 100 may provide voice commands such as "remove", "combine with OR", etc. to perform the same or similar actions for search parameters as the touch inputs, as will be described in more detail below with respect to FIG. 2. Additionally or alternatively, in some implementations, a user can interact with token(s) of the displayed search results 106B, 108B, 110B to modify the combined search, e.g., by striking through terms that should be excluded from the next round of search results.

In some implementations, a user may be able to strike through (or swipe away, etc.) an entire search result to eliminate it from consideration. In some such implementations, differences between the eliminated search result and the remaining search results may be determined and used to infer constraints on subsequent combined queries. For example, a set of topics may be identified from each search result and compared to similar sets identified for other search results. Topics that are unique to an eliminated search result may be inferred and used to constrain a subsequent combined search query to exclude those terms. As an example, suppose a user eliminates a lone search result pertaining to "amateur" basketball from a list of search results that otherwise uniformly pertain to "professional" basketball. Although the user has not explicitly stricken the word "amateur," this may nonetheless be inferred based on a comparison between the eliminated search result and the remaining search results.

While the example of FIGS. 1A-B depicts a single user 100 engaged in a single session with the virtual assistant, this is not meant to be limiting. As will be described in more detail below, techniques described herein may be implemented outside the context of a virtual assistant, e.g., as part of a user's research session performed using a conventional web browser. Moreover, there is no requirement that queries be part of the same session (e.g., with a virtual assistant, with a web browser, etc.) in order to be considered for inclusion in the same line of inquiry. As noted elsewhere herein, historical search queries (and/or their results) across multiple different sessions and/or across multiple different users may be analyzed for membership in a shared line of inquiry and/or used to extract parameters for inclusion in a combined search query.

Figure 2:
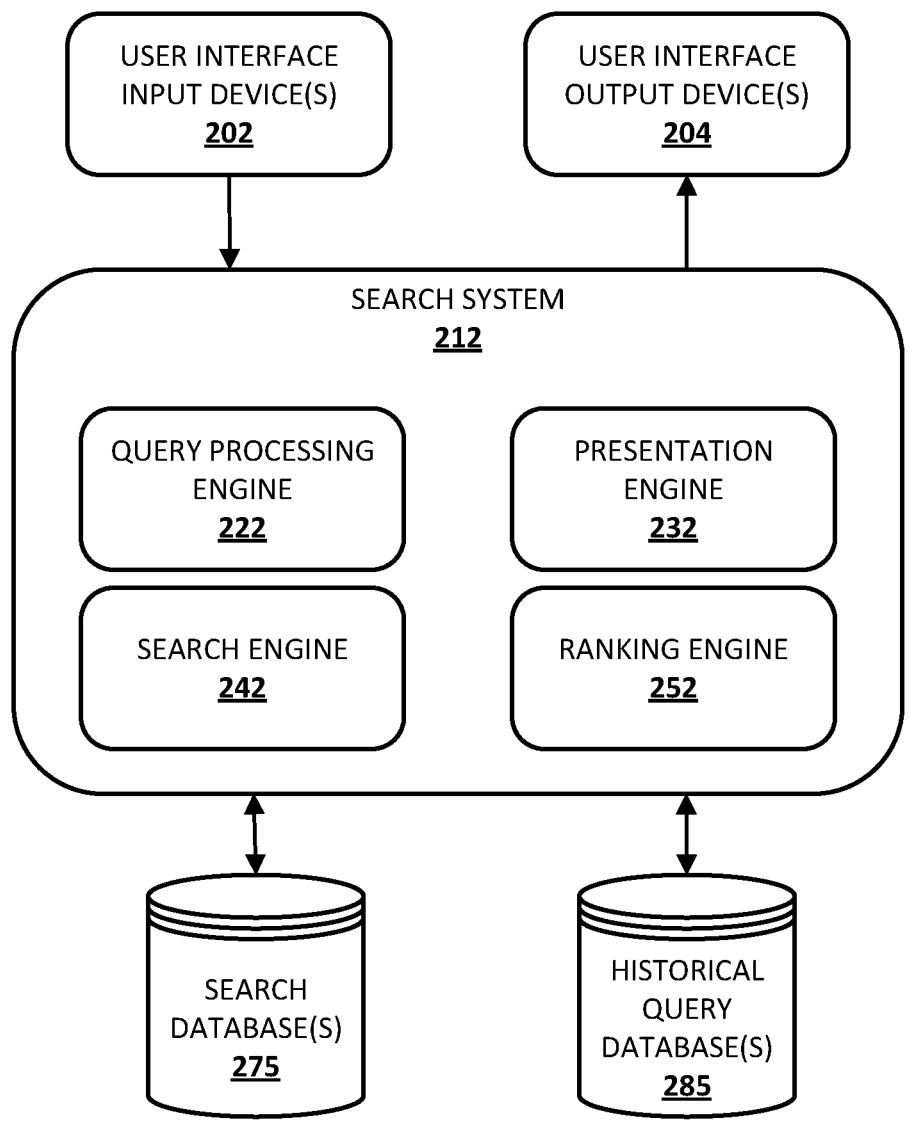
FIG. 2 illustrates an example environment in which selected aspects of the present disclosure may be implemented.

FIG. 2 illustrates an example environment in which a combined search query may be generated based on search parameters of a current search query and search parameters of the most recent previously submitted search queries that are determined to be of the same line of inquiry as the current search query.

The example environment includes one or more user interface input devices 202, one or more user interface output devices 204, and a search system 212. Although search system 212 is illustrated in FIG. 2 as separate from the user interface output and input devices 202, 204, in some implementations all or aspects of the search system 212 may be implemented on a computing device that also contains the user interface input device(s) 202 and/or the user interface output device(s) 204. For example, all or aspects of a presentation engine 232 and/or a query processing engine 222 of search system 212 may be implemented on the computing device. In some implementations, all or aspects of the search system 212 may be implemented on computing device(s) that are separate and remote from a computing device that contains the user interface input devices 202 and/or the user interface output devices 204 (e.g., all or aspects may be implemented "in the cloud"). In some of those implementations, those aspects of search system 212 may communicate with the computing device via one or more networks such as a local area network (LAN) and/or wide area network (WAN) (e.g., the Internet). In some implementations, one or more aspects of search system 212 and user interface input/output devices 202, 204 may be implemented or assisted by the virtual assistant or a component of the virtual assistant. For example, in some implementations, query processing engine 222 may be a component of the virtual assistant described previously.

The user interface input devices 202 may include, for example, a physical keyboard, a touch screen, a vision sensor such as a digital camera, an accelerometer (e.g., to capture gestures), fingerprint sensor, radar sensor (e.g., to visibly detect gestures), and/or a microphone, to name a few. The user interface output devices 204 may include, for example, a display screen, a haptic feedback device, and/or speaker(s). The user interface input and output devices 202, 204 may be incorporated on one or more computing devices of a user. For example, a mobile phone of the user may include the user interface input and output devices 202, 204; or a standalone personal virtual assistant hardware device may include the user interface input and output devices 202, 204; or a first computing device may include the user interface input device(s) 202 and a separate computing device may include the user interface output device(s) 204; etc. A "standalone personal virtual assistant hardware device" may be a device that is designed primarily or exclusively to allow a user to interact with a virtual assistant using free-form natural language input. These may take various forms, such as standalone "smart" speakers, smart displays, etc.

As illustrated in FIG. 2, a user provides a search query to the search system 212 via the user interface input device(s) 202. The search system 212 provides responsive output for presentation to the user via the user interface output devices(s) 204. Each search query is a request for information. The search query can be, for example, in a text form and/or in other forms such as, for example, audio form and/or image form. For example, in some implementations, the user interface input device(s) 202 may include a keyboard that generates textual input in response to user interface input directed to the keyboard. Also, for example, in some implementations, user interface input device(s) 202 may include a microphone. In some such cases, a speech recognition module that is local to search system 212 or with which search system 212 may communicate may convert audio speech input received at the microphone into textual input. Subsequently, the textual input may be provided to search system 212. For brevity, the input is illustrated in FIG. 2 as being provided directly to the search system 212 by the user interface input device(s) 202 and the output is illustrated as being provided by the search system 212 directly to the user interface output device(s) 204. However, it is noted that in various implementations one or more intermediary software and/or hardware components may be functionally interposed between the search system 212 and the user interface input and/or output devices 202, 204, and may optionally process the input and/or output. Thus, in some implementations, a user may communicate with all or aspects of search system 212 utilizing a plurality of client computing devices that collectively form a coordinated "ecosystem" of computing devices.

The search system 212 may additionally include the aforementioned query processing engine 222, the aforementioned search engine 242, a ranking engine 252 and a presentation engine 232. In some implementations, one or more of engines 222, 242, 252, and/or 232 may be omitted, combined, and/or implemented in a component that is separate from search system 212. For example, one or more of engines 222, 242, 252, and/or 232 or any operative portion thereof, may be implemented in a component that is executed by a client computing device that includes the user interface input and/or output devices 202 and 204 and that is separate from the search system 212. Also, for example, the search engine 242 and/or the ranking engine 252 may be implemented in whole or in part by a system that is separate from the search system 212 (e.g., a separate search system in communication with the search system 212).

Query processing engine 222 processes input, including search queries, received by the search system 212. In some implementations, query processing engine 222 may use natural language processing techniques to generate annotated output based on the input. For example, the query processing engine 222 may process natural language free-form textual input that is generated based on user interface input generated by a user via user interface input device(s) 202. The generated annotated output includes one or more annotations of the textual input and optionally one or more (e.g., all) of the terms of the textual input.

The query processing engine 222 may perform other natural language processing tasks, such as identifying and annotating various types of grammatical information and references to entities included in the textual input. For example, the query processing engine 222 may include a part of speech tagger, a dependency parser, and an entity tagger as described above with respect to the virtual assistant of FIGS. 1A-1B. The entity tagger may be able to use content of the natural language textual input to resolve a particular entity and/or may optionally communicate with a knowledge graph or other entity database to resolve a particular entity. The query processing engine 222 may also use related prior input and/or other related data outside of the particular textual input to resolve one or more entity references. For example, a first query of a user in a dialog with the search system 212 may be "presidential debates" and a subsequent query of the user may be "when is the next one?". In processing "when is the next one", the coreference resolver may resolve "one" to "presidential debate" utilizing the prior input of "presidential debates".

The query processing engine 222 may be further configured to monitor the search queries derived from the textual input and the annotations for semantic similarity with one or more submitted previous search queries, in order to determine when two or more search queries submitted by a user comprise a shared line of inquiry. As noted previously, in some implementations, the fact that two queries were received successively may boost the likelihood that they will be deemed part of the same shared line of inquiry.

In some implementations, the system will only monitor search queries submitted by the same user, as indicated by search system 212 and historical query database(s) 285 based on, for example, IP address, sensor data of the user interface input device(s), browser metadata, and user account log in data. In systems in which input may be provided in the form of voice input, search queries may be determined to be submitted by the same user based on a user voice recognition profile local or accessible to search system 212 and/or the historical query database(s) 285.

In some implementations, search queries and input from multiple users may be used in determining a shared line of inquiry exists or in formulating an updated combined search query. For example, one or more users may provide input indicating another user to involve in the search and/or may provide a shared research session identifier that may allow any user with the session identifier, and optionally some sort of authorization credentials, to participate in or modify the combined query generation process. In some implementations, only the previous search queries of a particular user will be used in determining that a shared line of inquiry exists, but thereafter anyone with the necessary session identifier and credentials can modify the search parameters for their own separate off-shoot line of inquiry or for a shared research session line of inquiry that is shared between them and the particular user. In other implementations, when a new user joins the shared research session by providing their session identifier and authorization credentials, a particular number of their own most recently submitted previous search queries may be compared to the current combined search query and, if sufficiently semantically similar, used in generating new search parameters or modifying existing ones.

In some implementations, determining semantic similarity may be accomplished by embedding, in latent space and via the query processing engine 222 or another component in communication with the query processing engine 222, one or more of the N most recent previously submitted search queries of the user and the current search query. The query processing engine 222 may then determine the distance between each of the embeddings associated with the most recent previously submitted search queries and the embedding associated with the current search query. This distance between the embeddings may then be used as a proxy for semantic similarity, with lesser distances indicating more semantic similarity between the terms represented by the embeddings and greater distances indicating less semantic similarity between the terms.

In some implementations, semantic similarity may be determined by a semantic similarity machine learning model trained on historical query data of multiple users stored in one or more historical query databases 285. This historical query data may include indications of search parameters submitted to the search system 212, or to another search system associated with the one or more historical query databases 285, and/or indications of one or more highest ranked search results determined to be responsive to those search parameters when searches were previously performed based on them. The semantic similarity machine learning model may be trained to take input(s) comprising indications of the one or more highest ranked search results from the previous searches and/or the previous search parameters of the previous searches and provide, as output(s), one or more indications of semantic similarity between the current search parameters and the results or parameters of the previous search.

Therefore, implementations described herein provide that previously submitted search queries of a user may be determined to share a line of inquiry with a current search query based on the previous search terms being semantically similar to the current search terms and/or based on content of the previous search results being semantically similar to the current search terms.

In order to analyze search queries issued by a user, the query processing engine 222 may access one or more historical query databases 285 associated with the user and, optionally, one or more additional users of the search system 212 or additional search systems associated with the search system 212. In some implementations, the historical query databases 285 may provide the query processing engine 222 with previously-submitted search queries in audio, textual, annotated, or un-annotated forms, and the query processing engine 222 may process the previously-submitted search queries to generate annotated, textual representations of the queries before converting them into embeddings in latent space or providing them as input(s) to the semantic similarity machine learning model. In some implementations, historical query databases 285 may store the previously-submitted previous search queries as latent space embeddings or in some form easily converted to latent space embeddings. In some implementations, historical query databases 285 may additionally or alternatively store voice recordings corresponding to the user interface input received by the search system 212 and/or the one or more user interface input device(s) 202.

In some implementations, query processing engine 222 may access or retrieve the one or more most recent previously submitted search queries stored in the historical query databases 285 each time it receives a current search query from the user via the user interface input device 202, in order to perform the comparison between the previous search queries and the current search query. In some implementations, the most recently-submitted previous search queries determined to be within a threshold level of semantic similarity, or within a threshold distance in embedding space, may be grouped together within the historical query database 285 and the query processing engine 222 may then retrieve the entire group or several of the most recent of the group.

In other implementations, the query processing engine 222 may compare, or retrieve and then compare, only the single most recently-submitted previous search query to the current search query, and then only in the case that the single most recently-submitted previous search query is determined to share a line of inquiry with the current search query does the query processing engine compare the current search query to the next most recently-submitted previous search query. This process may repeat until the query processing engine 222 determines that a previously submitted search query does not share a line of inquiry with the current search query, or until a maximum number of the previously submitted search queries are all determined to share a line of inquiry with the current search query.

In some implementations, this maximum number of previously-submitted search queries used in determining search parameters may vary based on the determined level of similarity between the current and previous search parameters. In some implementations, the maximum number of previous search queries may be dynamically calculated after each search query comparison. This maximum number of previous queries to use in generating search parameters may be determined based on the average or median distance between (a) the next most recently-submitted previous search query that has yet to be compared and (b) a combined embedding representing the current search query and all previous search queries that have been determined to share a line of inquiry. Additionally or alternatively, this maximum number of previous queries may vary based on the last distance determined between the embeddings of (a) the current search query and (b) a previously submitted search query. Thus, the maximum number of previously submitted search queries used in generating search parameters may increase or decrease based on these figures indicating an overall trend or a recent trend of more or less semantic relatedness between subsequent comparisons.

Additionally or alternatively, in some implementations, heuristics and/or "linking" grammar models may be used to determine whether two or more search queries are part of a shared line of inquiry. For example, a user may issue a first search query of "Chris Evans", be presented with results responsive to the search that may be, for example, relevant to the famous American actor "Chris Evans" known for starring in superhero movies. The user may then provide input of "Actually, I meant the English guy", where "Chris Evans" is also the name of a popular talk show host from England. The query processing engine 222 may thereafter determine that the phrase "Actually, I meant . . . " is intended to "link" the phrase "the English guy" to the most recent previously submitted search query. The query processing engine 222 may then process the terms of "the English guy" to determine which search parameters to use to modify the current search query of "Chris Evans". For example, the query processing engine 222 may determine that "English" is an adjective modifying the noun "guy", and that the noun "guy" may be resolved as referring to "Chris Evans" and therefore may be superfluous. Thus, the query processing engine 222 may determine that the search query of "Chris Evans" should be modified by the search parameter "English".

When the query processing engine 222 determines that a given previously submitted search query is of the same line of inquiry as the current search query, the query processing engine 222 may generate a combined search query comprising at least one search parameter from the current search query and at least one search parameter from the given recently submitted previous search query. Generating the combined search query may occur automatically or, in some implementations, the user may be prompted to enter into a "state-maintaining search mode" or "stateful" session that, if entered into, will continue to modify submitted search queries based on a tracked "state" of the line of inquiry until the user exits the "mode" or, in some cases, until a search query is submitted that is below a threshold level of similarity to the previous search query. In other cases, the "state-maintaining search mode" may continue until user input constituting an "interruption" of the "state-maintaining search mode" is identified, such as switching applications or failing to interact with the search system 212 for a threshold period of time.

In some implementations, the "state" of a search during the "state-maintaining search mode" may be calculated anew for each turn, such that a new, updated combined search query may contain only at least one parameter from the previous combined search query. In other implementations, the "state" may be calculated for the session as a whole, such that an overall session combined search query contains at least one search parameter from each of previously submitted search queries determined to relate to the shared line of inquiry of the session.

Once the search parameters are determined, the query processing engine 222 may provide data describing the search parameters to the search engine 242. The search parameters may be used in various ways by the search engine 242 during performance of the search of one or more search databases 275, as discussed above. The search engine 242 may treat the search parameters as mandatory, optional, unweighted, or weighted search terms, or as filters designed to include or exclude results mentioning certain terms or mentioning certain terms in certain, identified contexts of the resources associated with the search results. Thus, the search parameters of the combined search query ultimately used to perform the search of the search database(s) 275 may include more, less, or different parameters and terms than the parameters of the current search query submitted to the search system 212 by the user.

Once search engine 242 generates the results of the search of the search databases 275 performed based on the combined search query, the results are provided to the ranking engine 252. The ranking engine 252 may rank the search results according to the relevance of the resources associated with the results to the search parameters of the combined search query. The ranking engine 252 may be configured to take into account any weights assigned to the search parameters in ranking the search results, when applicable. The ranking engine 252 may also be configured to rank the results such that the highest ranked group of results contains a certain amount of diversity, whether it be diversity of resource type, diversity of resource content, or diversity of search parameters to which the resources are determined to be responsive.

The ranked search results are then provided to the presentation engine 232. The presentation engine 232 provides the ranked search results that are responsive to the combined search query to one or more user interface output devices 204 for presentation to the user in various audible and/or visible output formats. For example, in some implementations, search system 212 may be implemented as, or in communication with, a virtual assistant that engages in audible dialog with the user. In such implementations, the search system 212 may receive the current search query from the user during a dialog session with the virtual assistant and may provide one or more of the ranked search results as part of the dialog in response to receiving the current search query.

In some implementations, the presentation engine 232 will also provide indications of the search parameters of the combined search query along with the ranked search results to the one or more user interface output devices 204. For example, the search system 212 may receive the current search query from the user via touch input from an on-screen keyboard of a mobile device and may provide a search results page including visual representations of one or more ranked search results and the search parameters of the combined search query that were used in the search via the user interface output device(s) 204.

In some implementations, the user may interact with the search parameters of the combined query via one or more of the user interface input devices 202. For example, the user may tap on a screen or provide a spoken command via a microphone of the user interface input device(s) 202 indicating their desire to have the search parameters of the combined search query removed, replaced, supplemented, modified, or weighted differently. This may comprise, for example, the user providing a "strikethrough" input on a graphical "token" element representing the search parameter to remove the search parameter or modify the search parameter such that the modified search parameter is "NOT [search parameter]".

As another example, the user may drag a graphical "token" element up or down in a visual list of search parameters to modify the weighting of the search parameter in the search or drag one graphical "token" element on top of another graphical "token" element to create an aggregated or Boolean search parameter such as "[search parameter 1] AND [search parameter 2]". As yet another example, the user may tap on a graphical "token" element one or more times to cycle through visual representations of how the search parameter may be used (e.g., tapping once to strikethrough, tapping twice to bold or italicize indicating higher/lower weighting of the parameter, etc.). A user may additionally be able to provide some touch input, such as a "double-click" or "long-tap", to bring up a search parameter editing box in which search parameter text may be added or modified via a touch screen, a mouse input device, or a keyboard input device.

The user may also be able to add search parameters not already indicated by the output via the user interface input device(s) 202. For example, a user may select a graphical "token" element with touch input to access an editing menu for the search parameters, and enter a new search parameter to add to the search via a textual input element that appears in response to selecting the editing graphical "token" element.

In some implementations, the user may also be able to speak a voice command such as "remove [search parameter]", "weight [search parameter 1] less than [search parameter 2]", and "[search parameter 1] but NOT [search parameter 2]", which may result in forming a combined search parameter of "[search parameter 1] NOT [search parameter 2]". As another example, a user may speak the command "add [search parameter X] to my search" to add the search parameter "[search parameter X]" which was not previously included in the combined search query or indicated in the user interface output.

When the user provides input to the user interface input device(s) 202 modifying the search parameters of the combined search query, the query processing engine 222 processes the input indications to determine which modifications to make for one or more search parameters. For example, in some implementations, the query processing engine 222 may determine that an input corresponding to a swipe action on a given graphical "token" element indicates a strikethrough or removal modification of the underlying search parameter. In some voice-enabled implementations, the heuristics and/or "linking" grammar models may be used to determine which modifications should be made. For example, the query processing engine 222 may determine that user input corresponding to the phrase "actually, take that off" indicates a removal of the most recently added search parameter.

Additionally or alternatively, in some implementations, comparisons of embeddings in latent space and/or by the semantic similarity machine learning model may be used in determining which modifications to make to the search parameters of the combined query. For example, one or more candidate modifications for a given search parameter or group of search parameters may be determined and the candidate modification that produces a new combined search query with greater or lesser semantic similarity to the old combined search query and/or to the search results determined to be responsive to the old combined search query. Thus, in some implementations, initially, search system 212 may select those previously-submitted previous search queries with search parameters or results indicating a very high level of semantic similarity to a current query for creating the initial combined search query. Thereafter, search system 212 may select the search parameters determined based on those semantically similar previously submitted search queries that have the lowest levels of similarity to the parameters included in the current query.

In other implementations, the desired degree of semantic similarity between the new, selected search parameters and the search parameters of the current query may vary based on the degree of semantic similarity of the search queries used to determine the current search parameters of the current search query. For example, new search parameters corresponding to higher degrees of semantic similarity may be desired when an average degree of similarity between the queries used in generating the current search parameters exhibit is lower but new search parameters corresponding to lower degrees of semantic similarity may be desired when an average degree of similarity between the queries used in generating the current search parameters exhibit is higher.

In some implementations, the presentation engine 232 may additionally determine one or more search result graphical "token" elements in the form of selectable graphical or audio elements to provide with the search results in the graphical user interface ("GUI") of the user interface output device(s) 204. These search results graphical "tokens" may allow the user to directly interact with the search results and the current search parameters. In some implementations, a search result "token" provided in a graphical or audio element next to, immediately following, or included in a search result indication may include a suggested search parameter determined based on the current search parameters and from content of the resource associated with that result that is determined to be relevant to those current search parameters.

The suggested search parameters may be determined by the presentation engine 232, by the query processing engine 222, and/or by one or more other components of search system 212. For example, a user may be presented with a suggestion of a search parameter such as "include: [search parameter 1]" or "important: [search parameter 1]". When the user selects these tokens, "[search parameter 1]" may be added as a new search parameter or it may be switched between optional/mandatory or reweighted as more/less important. Once the user selects a "token", an updated combined query is determined by the query processing engine 222 for performing an updated search of the one or more search databases 275. One or more of the suggested search parameters may be determined as described above with respect to determining search parameter modifications, e.g., the suggested search parameters may be selected based on the semantic similarity of their terms, the terms of their associated previously submitted queries, or the content of the resources responsive to the associated previously submitted queries to the terms of the current combined query.

In some implementations, the selectable uniform resource locator ("URL") links provided along with the search results may be "tokens" as well. In those implementations, when a user selects a URL link corresponding to a particular search result, the presentation engine 232, the query processing engine 222, and/or one or more other components of search system 212 may determine one or more modifications to automatically make to the current search parameters based on the current search parameters and from content of the resource that is determined to be relevant to those current search parameters. One or more terms describing content from the resources may be determined to be relevant to the current search parameters based on their frequency of occurrence, location in the content of the resource, relative location in the content of the resource when compared to the location of other recurring or important terms or search parameters, and their appearance in the text including font, size, and alignment. For example, terms found in the title at the top of an article, bolded, or recurring within a certain number of words of a current search parameter may be determined to be relevant to the current search parameters.

After the search parameter modifications are determined, the combined search query will be automatically updated by the query processing engine 222 based on the determined modifications and provided to search engine 242 for performing an updated search of the one or more search databases 275, optionally after first prompting the user to submit the new, updated combined search query or otherwise indicate that they are finished modifying the search parameters.

In some implementations, similarity learning may be employed to train a similarity function, such as machine learning model, that is used to determine semantic similarity between queries—e.g., by embedding those queries into latent space—based on feedback from the user while the user is in the stateful search session. In some implementations, such a machine learning model may take the form of, for instance, an encoder portion of an encoder-decoder network, a support vector machine, etc. As a non-limiting example, an encoder may be used to generate an embedding of a user's latest query in latent/embedding space such that the embedding is clustered with neighbor embeddings generated from other queries obtained from, for instance, historical query database(s) 285. Parameter(s) from those other queries represented by the neighboring embeddings in the cluster may be combined with parameter(s) of the latest query to generate a combined search query. This combined search query may then be used to retrieve a new set of search results.

However, suppose the user signals that they are unhappy with the search results, e.g., by quickly pressing a "back" button, by explicitly providing negative feedback (e.g., "Hey assistant, that's not what I was looking for," or "no, I wanted results with <x> parameter."), or by otherwise rejecting or altering parameters as described previously. In some implementations, this negative feedback may be used to train the encoder network such that next time it encounters a similar query, the embedding of that query will be farther from the aforementioned cluster. For example, in some implementations, techniques such as regression similarity learning, classification similarity learning, ranking similarity learning, and/or locality sensitive hashing (one or more of which may include techniques such as triplet loss), may be employed to train the encoder network to learn similarities.

Figure 3A:
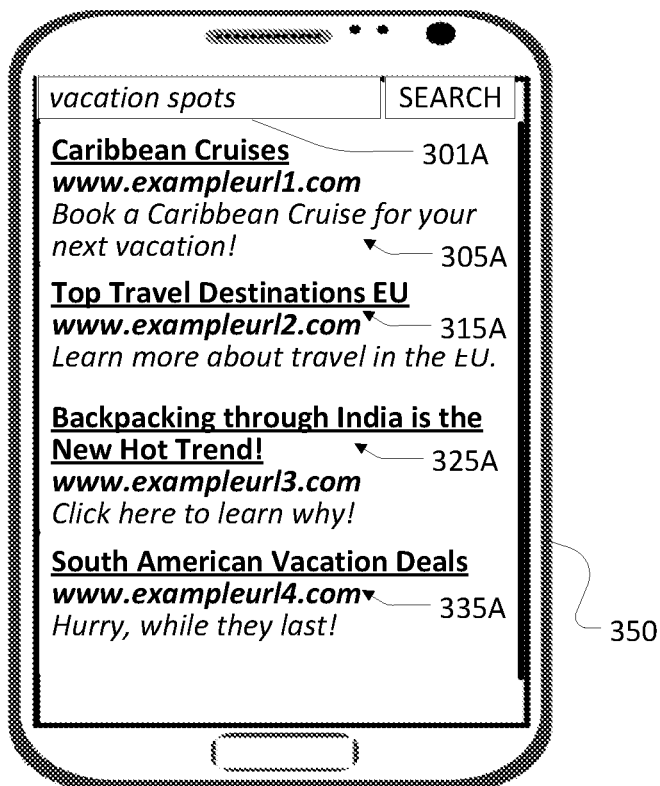
FIG. 3A and FIG. 3B illustrate a computing device that includes one or more microphones and illustrates an example method of using "relate-back" grammar models in a voice-enabled search system, such as search system of FIG. 2, to identify a shared line of inquiry according to implementations described herein.
Figure 3B:
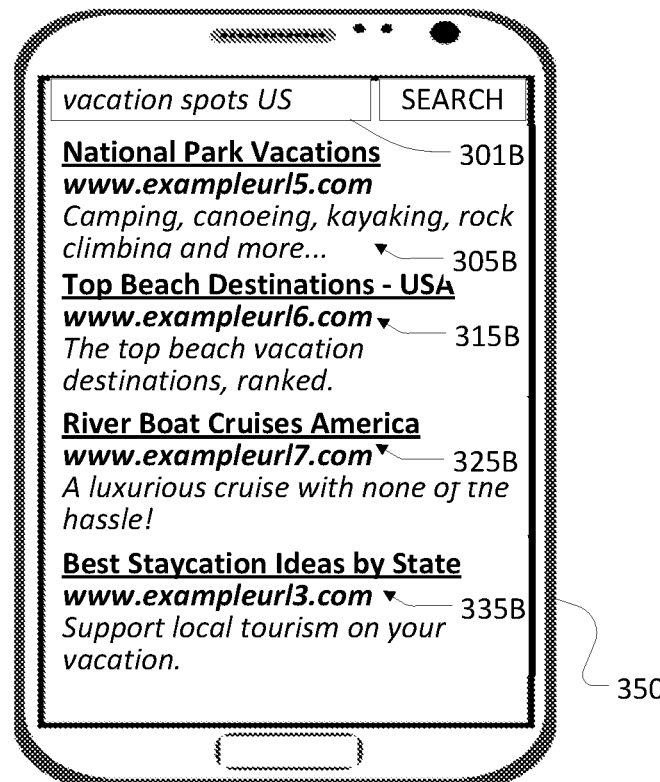

FIGS. 3A-3B illustrates a computing device 350 that includes one or more microphones (not depicted) and illustrates an example method of using "relate-back" grammar models in a voice-enabled search system, such as search system 212 of FIG. 2, to identify a shared line of inquiry according to implementations described herein. One or more aspects of the processes illustrated in this example may be implemented by a virtual assistant according to implementations described herein. One or more aspects of the virtual assistant may be implemented on the computing device 350 and/or on one or more computing devices that are in network communication with the computing device 350. In some implementations, the computing device 350 may comprise or may be communicatively coupled to and/or part of one or more of the user interface input devices 202 and/or one or more of the user interface output devices 204 of FIG. 2.

In FIG. 3A, the user provides an initial voice input 300A to a voice-enabled search system in the form of a voice utterance. The voice-enabled search system then processes initial voice input 300A to determine initial search parameters 301A. In some implementations, initial voice input 300A may be provided as part of a dialog between the user and the virtual assistant and the virtual assistant may provide the initial search parameters 301A to the search system based on processing the initial voice input 300A. For example, the user may speak an initial voice input 300A comprising a voice utterance of "Hey Assistant, search the web for VACATION SPOTS" as shown in FIG. 3A. The virtual assistant may process the initial voice input 300A comprising the voice utterance to determine the initial search parameters 301A "vacation spots" and submit them to the search system.

In response to the initial search parameters 301A, the search system obtains search results 305A, 315A, 325A, and 335A and ranks them according to their relevancy to the initial search parameters 301A. In some implementations, the ranked search results 305A, 315A, 325A, and 335A are provided via visual representation of at least a portion of the search results on a display screen of the computing device 350 or of another computing device communicatively coupled to the computing device 350, the virtual assistant, and/or the voice-enabled search system. Additionally or alternatively, in some implementations, the virtual assistant may provide one or more of the highest ranked search results 305A, 315A, 325A, and 335A for audible presentation to the user via one or more speakers of the computing device 350 or of another computing device communicatively coupled to the computing device 350, the virtual assistant, and/or the voice-enabled search system.

During or shortly after presentation of the search results, the user may provide subsequent voice input 300B that the user intends to have "relate-back" to their initial voice input 300B, as shown in FIG. 3B. For example, the subsequent voice input 300B may comprise a voice utterance of "Actually, I meant ones in the US" to indicate that they would like their search constrained to vacation spots within the United States. The voice-enabled search system and/or the virtual assistant may determine that the phrase "Actually, I meant . . . " is intended to "relate" the phrase "ones in the US" "back" to the most recent voice input comprising the initial voice input 300A in the example of FIG. 3A. Such a "relate-back" phrase is used as an indication that the subsequent voice input 300B is a part of a shared line of inquiry with the initial voice input 300A. The voice-enabled search system and/or the virtual assistant may then process the terms "ones in the US" according to implementations described herein to determine the modified search parameters 301B to be used in the search. For example, the voice-enabled search system and/or the virtual assistant may determine that "in the US" is a prepositional phrase meant to modify the noun "ones", and that "ones" may be resolved as referring to "vacation spots".

Based on identifying the user's intent to have the subsequent voice input 300B "relate-back" to the initial voice input 300A, the voice-enabled search system and/or the virtual assistant may identify at least one search parameter from each of the initial voice input 300A and the subsequent voice input 300B to include in the modified search parameters 301B of "vacation spots US".

In some implementations, determining the modified search parameters 301B may be accomplished via re-processing the voice utterance comprising the initial voice input 300A in light of the context provided by the subsequent voice utterance comprising the subsequent voice input 300B, and vice-versa, such that different transcriptions of the utterances may be determined to best correspond to the voice inputs 300A, 300B based on the context each utterance provides to the other.

In some implementations, determining the modified search parameters 301B may be accomplished via embedding one or more different transcriptions of the initial and/or subsequent voice utterances in latent space, selecting the embeddings to each correspond to the initial voice input 300A and the subsequent voice input 300B based on their distances from one another in latent space, and selecting one or more terms from each voice input 300A, 300B transcription to be included in the modified search parameters 301B according to the implementations discussed above.

Subsequent to determining the modified search parameters 301B, the virtual assistant may provide the modified search parameters 301B to the search system and the search system will perform a new search based on the modified search parameters 301B. In response to the modified search parameters 301B, the search system obtains at least search results 305B, 315B, 325B, and 335B and ranks them according to their relevancy to the modified search parameters 301B. In some implementations, the ranked search results 305B, 315B, 325B, and 335B are provided via visual representation of at least a portion of the search results on a display screen of the computing device 350 or of another computing device communicatively coupled to the computing device 350, the virtual assistant, and/or the voice-enabled search system. Additionally or alternatively, in some implementations, the virtual assistant may provide one or more of the highest ranked search results 305B, 315B, 325B, and 335B for audible presentation to the user via one or more speakers of the computing device 350 or of another computing device communicatively coupled to the computing device 350, the virtual assistant, and/or the voice-enabled search system.

Figure 4:
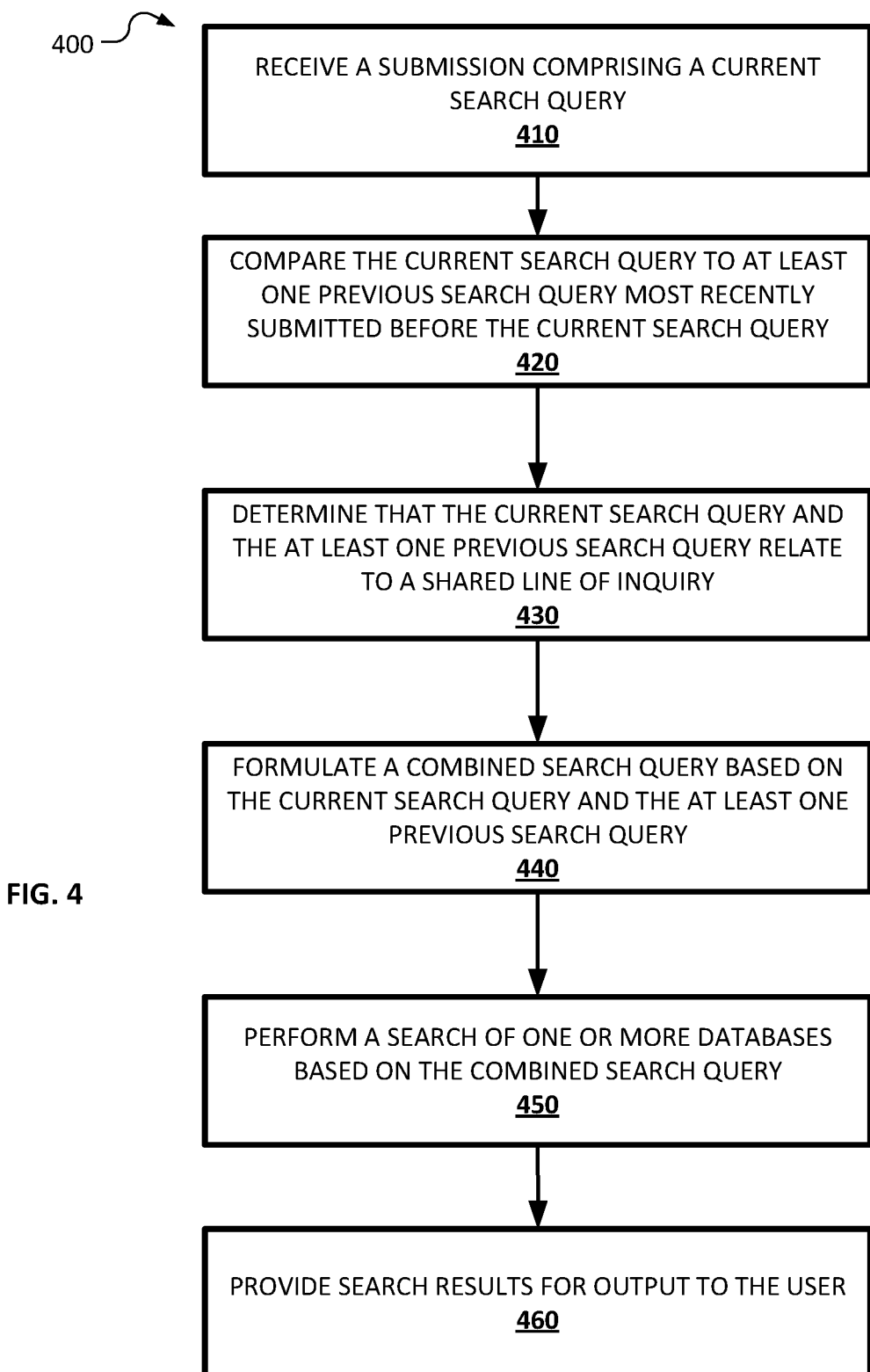
FIG. 4 is a flowchart illustrating an example method 400 according to implementations disclosed herein.

FIG. 4 is a flowchart illustrating an example method 400 according to implementations disclosed herein. For convenience, the operations of the flow chart are described with reference to a system that performs the operations. This system may include various components of various computer systems, such as search system 212 and user interface input and output devices 202, 204. Moreover, while operations of method 400 are shown in a particular order, this is not meant to be limiting. One or more operations may be reordered, omitted or added.

At block 410, the system, e.g., by way of query processing engine 222, receives a submission of a current search query in the form of textual input. The textual input may be generated as part of a dialog by a user and the system, and may be based on user interface input generated by a user interface input device, such as a microphone or graphical keyboard appearing on a touch screen.

At block 420, the system, e.g., by way of query processing engine 222, compares the current search query to one or more previous search queries submitted by the user. This may occur, for example, via embedding a representation of the current search query in latent space and calculating a distance between this embedding it and one or more embeddings representing the one or more previously-submitted search queries.

At block 430, the system, e.g., by way of query processing engine 222, determines that the current search query and one or more of the previously-submitted search queries relate to a shared line of inquiry. In some implementations, this may be determined based on the embeddings of the current search queries and the previously submitted search queries being within a threshold distance of one another in latent space. This distance may represent a certain threshold level of semantic similarity, thus indicating a high likelihood of the search queries being related to a singular search effort of the user.

In various implementations, other signals may be embedded with the search queries, or otherwise used to determine semantic similarity. For example, temporal proximity of two queries may influence whether they are deemed semantically similar, especially where the semantic similarity by itself (i.e. based exclusively on content of the queries) may not be sufficient to be dispositive. As another example, attributes and/or parameters of responsive search results may also be embedded with the search queries that caused the retrieval of those search results. Suppose a user does not explicitly mention "basketball" in a search query, but that search results presented in response to the user's search query are predominantly related to basketball, and the user responds positively to those results (e.g., by clicking one or more of them). The topic of "basketball" may be embedded with the user's search, in combination with other tokens explicitly provided by the user, to act as an additional constraint when determining whether subsequent searches are part of the same line of inquiry.

At block 440, the system, e.g., by way of query processing engine 222, formulates a combined search query based on the current search query and the one or more previous search queries. The combined search query may contain at least one term, or search parameter, from each of the current search query and at least one of the previous search queries determined to be related to the same line of inquiry as the current search query. In a case where multiple previous search queries are determined to be related to the same line of inquiry as the current search query, the system may select a threshold number of search parameters and/or may determine weighting factors to assign to the search parameters based on the similarities of the given previous search queries to the current search query and/or to the other previous search queries. Optionally, the system may be configured to prioritize diversity of search parameters to a certain degree, such that the system will only select a search parameter to be included in the combined search query if there is sufficient semantic difference from the other selected search parameters or terms.

At block 450, the system, e.g., by way of search engine 242, performs a search of one or more databases based on the combined search query. The system searches the one or more databases to identify resources that are responsive to the combined search query. The system, e.g., by way of ranking engine 252, then ranks the search results corresponding to the resources based on their responsiveness to the combined query. In implementations where one or more search parameters have been assigned weighting factors, the system may take the weighting factors into account when determining responsiveness.

At block 460, the system, e.g., by way of search engine 242, ranking engine 252, and/or presentation engine 232, provides the search results for output to the user. The system may provide the search results at one or more user interface output devices included in or communicatively coupled to the system. The system may determine the number of search results to provide based on the output device and/or form of presentation. For example, when the output is provided to a user interface output device that includes a microphone but not a display screen and/or when the output to be presented in audio form, only the N highest ranked search results may be provided. As another example, when the output is to be provided on a small display screen, the number of highest ranked search results to provide may be selected such that selectable links associated with the search results are of a sufficient size and distance from one another to allow for precision in determinations of touch input corresponding to selectable link selection. In some implementations, a portion of the search results may be provided along with a visual or audio indication that the user may select a graphical element or speak a particular phrase to receive another portion of the search results.

Figure 5:
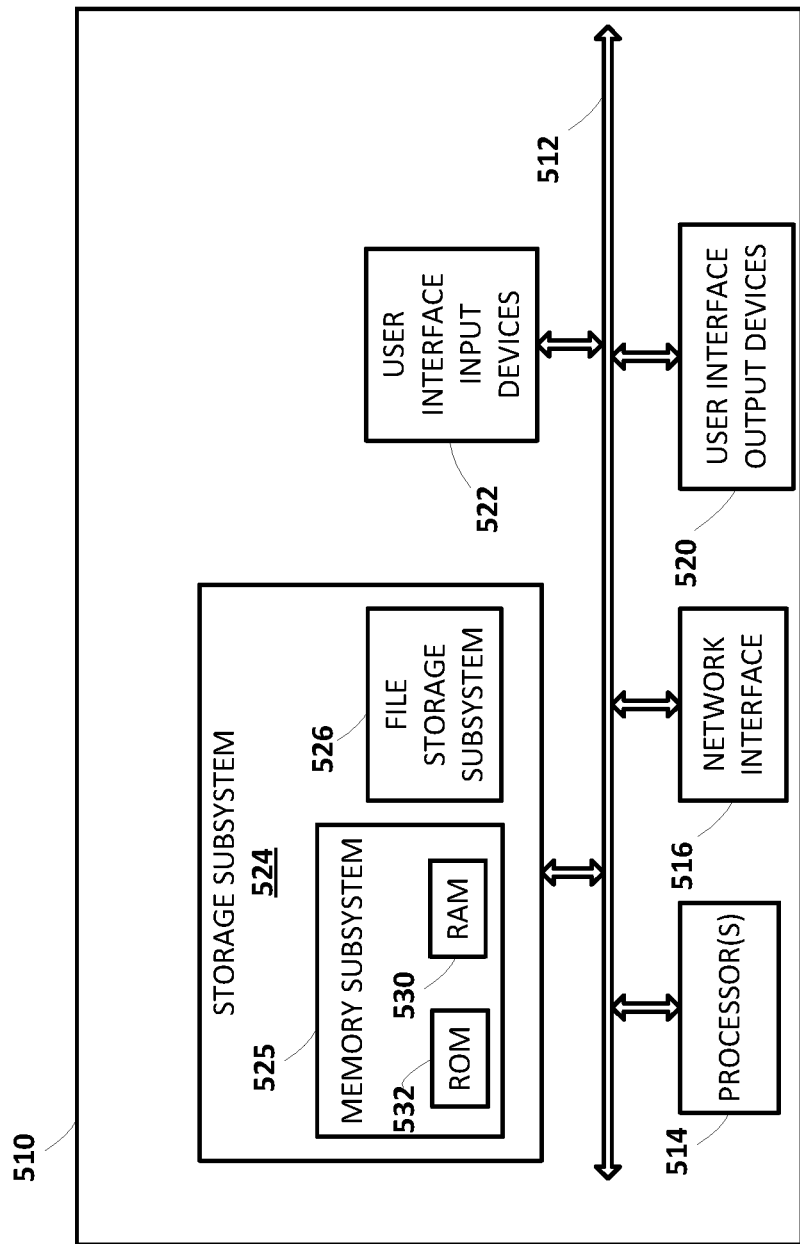
FIG. 5 is a block diagram of an example computing device 510 that may optionally be utilized to perform one or more aspects of techniques described herein.

FIG. 5 is a block diagram of an example computing device 510 that may optionally be utilized to perform one or more aspects of techniques described herein. In some implementations, one or more of search system 212, the virtual assistant, and/or one or more of the user interface input and/or output devices 202, 204 may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4. These software modules are generally executed by processor 514 alone or in combination with other processors.

Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a hand-held computing device, smart phone, workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented using one or more processors, comprising:
   obtaining data indicative of user input provided by a user to an input device associated with the user, the data including a current search query;
   determining that a previous search query most recently submitted by the user is below a threshold level of semantic similarity with respect to the current search query, wherein the determining includes:
      processing the current search query and the most recently submitted previous search query using a semantic similarity machine learning model to generate output indicating a level of semantic similarity between the current search query and the most recently submitted previous search query, and
      determining that the level of semantic similarity between the current search query and the most recently submitted previous search query indicated by the output is below the threshold level;
   determining, responsive to determining that the most recently submitted previous search query is below the threshold level of semantic similarity with respect to the current search query, that a next most recently submitted previous search query, submitted by the user, satisfies the threshold level of semantic similarity with respect to the current search query based on output generated by the semantic similarity machine learning model based on input including the next most recently submitted previous search query; and based on determining that the next most recently submitted previous search query satisfies the threshold level of semantic similarity with respect to the current search query:

generating a combined search query based on search query parameters determined from the current search query and the next most recently submitted previous search query, causing one or more search results obtained responsive to the combined search query to be presented to the user at an output device associated with the user, and entering into a stateful search mode session for the user, wherein, while in the stateful search mode session, each subsequently received search query submitted by the user is used to generate a new combined search query that includes at least one search parameter of a most recent previous combined search query of the stateful search mode session.

2. The method of claim 1, wherein the stateful search mode session for the user is maintained until user input indicates an interruption of the stateful search mode session.

3. The method of claim 1, further comprising:
entering into the stateful search mode session for a second user based on obtaining second data indicative of second user input of the second user providing a shared research session identifier that corresponds to the stateful search mode using a second input device.

4. The method of claim 3, further comprising:
subsequent to entering into the stateful search mode session for the second user:
receiving an indication of a new current search query input by the second user using the second input device, and
determining the new combined search query for the stateful search mode based on at least one search parameter of the combined search query determined for the user and further based on at least one search parameter of the new current search query provided by the second user.

5. The method of claim 3, further comprising:
subsequent to determining the new combined search query for the stateful search mode:
receiving a new indication of another new search query input by the user using the input device, and
determining a further new combined search query for the stateful search mode based on at least one search parameter of the new combined search query determined for the second user and further based on at least one search parameter of the new current search query provided by the user.

6. The method of claim 1, wherein the user input of the user comprises voice input and wherein the previous search query most recently submitted by the user is identified based on performing voice recognition on the voice input to determine a voice recognition profile associated with the voice input of the user.

7. A system, comprising:
one or more processors; and
memory storing instructions that, when executed by one or more of the processors, cause the one or more processors to perform operations comprising:
obtaining data indicative of user input provided by a user to an input device associated with the user, the data including a current search query;
determining that a previous search query most recently submitted by the user is below a threshold level of semantic similarity with respect to the current search query, wherein the determining includes:
processing the current search query and the most recently submitted previous search query using a semantic similarity machine learning model to generate output indicating a level of semantic similarity between the current search query and the most recently submitted previous search query, and
determining that the level of semantic similarity between the current search query and the most recently submitted previous search query indicated by the output is below the threshold level;
determining, responsive to determining that the most recently submitted previous search query is below the threshold level of semantic similarity with respect to the current search query, that a next most recently submitted previous search query, submitted by the user, satisfies the threshold level of semantic similarity with respect to the current search query based on output generated by the semantic similarity machine learning model based on input including the next most recently submitted previous search query; and
based on determining that the next most recently submitted previous search query satisfies the threshold level of semantic similarity with respect to the current search query:
generating a combined search query based on search query parameters determined from the current search query and the next most recently submitted previous search query,
causing one or more search results obtained responsive to the combined search query to be presented to the user at an output device associated with the user, and
entering into a stateful search mode session for the user, wherein, while in the stateful search mode session, each subsequently received search query submitted by the user is used to generate a new combined search query that includes at least one search parameter of a most recent previous combined search query of the stateful search mode session.

8. The system of claim 7, wherein the stateful search mode session for the user is maintained until user input indicates an interruption of the stateful search mode session.

9. The system of claim 7, the operations further comprising:
entering into the stateful search mode session for a second user based on obtaining second data indicative of second user input of the second user providing a shared research session identifier that corresponds to the stateful search mode using a second input device.

10. The system of claim 9, the operations further comprising:
subsequent to entering into the stateful search mode session for the second user:
receiving an indication of a new current search query input by the second user using the second input device, and determining the new combined search query for the stateful search mode based on at least one search parameter of the combined search query determined for the user and further based on at least one search parameter of the new current search query provided by the second user.

11. The system of claim 9, the operations further comprising:
subsequent to determining the new combined search query for the stateful search mode:
receiving a new indication of another new search query input by the user using the input device, and
determining a further new combined search query for the stateful search mode based on at least one search parameter of the new combined search query determined for the second user and further based on at least one search parameter of the new current search query provided by the user.

12. The system of claim 7, wherein the user input of the user comprises voice input and wherein the previous search query most recently submitted by the user is identified based on performing voice recognition on the voice input to determine a voice recognition profile associated with the voice input of the user.

13. One or more non-transitory computer-readable storage media encoded with instructions that, when executed by one or more computers, cause the one or more computers to perform operations comprising:
obtaining data indicative of user input provided by a user to an input device associated with the user, the data including a current search query;
determining that a previous search query most recently submitted by the user is below a threshold level of semantic similarity with respect to the current search query, wherein the determining includes:
processing the current search query and the most recently submitted previous search query using a semantic similarity machine learning model to generate output indicating a level of semantic similarity between the current search query and the most recently submitted previous search query, and
determining that the level of semantic similarity between the current search query and the most recently submitted previous search query indicated by the output is below the threshold level;
determining, responsive to determining that the most recently submitted previous search query is below the threshold level of semantic similarity with respect to the current search query, that a next most recently submitted previous search query, submitted by the user, satisfies the threshold level of semantic similarity with respect to the current search query based on output generated by the semantic similarity machine learning model based on input including the next most recently submitted previous search query; and
based on determining that the next most recently submitted previous search query satisfies the threshold level of semantic similarity with respect to the current search query:
generating a combined search query based on search query parameters determined from the current search query and the next most recently submitted previous search query,
causing one or more search results obtained responsive to the combined search query to be presented to the user at an output device associated with the user, and
entering into a stateful search mode session for the user, wherein, while in the stateful search mode session, each subsequently received search query submitted by the user is used to generate a new combined search query that includes at least one search parameter of a most recent previous combined search query of the stateful search mode session.

14. The one or more non-transitory computer-readable storage media of claim 13, wherein the stateful search mode session for the user is maintained until user input indicates an interruption of the stateful search mode session.

15. The one or more non-transitory computer-readable storage media of claim 13, the operations further comprising:
entering into the stateful search mode session for a second user based on obtaining second data indicative of second user input of the second user providing a shared research session identifier that corresponds to the stateful search mode using a second input device.

16. The one or more non-transitory computer-readable storage media of claim 15, the operations further comprising:
subsequent to entering into the stateful search mode session for the second user:
receiving an indication of a new current search query input by the second user using the second input device, and
determining the new combined search query for the stateful search mode based on at least one search parameter of the combined search query determined for the user and further based on at least one search parameter of the new current search query provided by the second user.

17. The one or more non-transitory computer-readable storage media of claim 15, the operations further comprising:
subsequent to determining the new combined search query for the stateful search mode:
receiving a new indication of another new search query input by the user using the input device, and
determining a further new combined search query for the stateful search mode based on at least one search parameter of the new combined search query determined for the second user and further based on at least one search parameter of the new current search query provided by the user.

18. The one or more non-transitory computer-readable storage media of claim 13, wherein the user input of the user comprises voice input and wherein the previous search query most recently submitted by the user is identified based on performing voice recognition on the voice input to determine a voice recognition profile associated with the voice input of the user.

* * * * *